US012165477B2

(12) United States Patent
Anderson

(10) Patent No.: US 12,165,477 B2
(45) **Date of Patent: *Dec. 10, 2024**

(54) ATM SECURITY APPARATUS AND METHOD OF USE

(71) Applicant: Synergy Group LLC, Louisville, KY (US)

(72) Inventor: Tate T. Anderson, Floyd Knobs, IN (US)

(73) Assignee: Synergy Group LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,549

(22) Filed: May 11, 2023

(65) Prior Publication Data

US 2023/0282077 A1 Sep. 7, 2023

Related U.S. Application Data

(63) Continuation of application No. 17/518,008, filed on Nov. 3, 2021, now Pat. No. 11,688,248, which is a continuation of application No. 16/505,162, filed on Jul. 8, 2019, now Pat. No. 11,189,138.

(51) Int. Cl.

*G07F 19/00* (2006.01)
*E01F 13/06* (2006.01)

(52) U.S. Cl.

CPC ............ *G07F 19/201* (2013.01); *E01F 13/06* (2013.01); *G07F 19/205* (2013.01)

(58) Field of Classification Search

CPC ....... G07F 19/201; G07F 19/205; E01F 13/06
USPC .............................................................. 49/49
See application file for complete search history.

(56) References Cited

U.S. PATENT DOCUMENTS 11,189,138 B2 * 11/2021 Anderson ............... E01F 13/06
11,688,248 B2 * 6/2023 Anderson .............. E01F 13/06 49/49

* cited by examiner

*Primary Examiner* — Daniel A Hess
(74) *Attorney, Agent, or Firm* — Frost Brown Todd LLP

(57) ABSTRACT

A security device or apparatus for use with an ATM includes a pair of base assemblies selectively connected by a beam assembly. The beam assembly is designed to prevent access to one or more service doors of the ATM. In one version of the device the beam assembly includes a horizontally extending beam with vertically oriented posts extending from the beam. The device allows for the beam of the beam assembly to be moved from a locked position or state to an unlocked position or state. In the locked position access to the one or more service doors of the ATM is restricted or prevented, while in the unlocked position access to the one or more service doors of the ATM is permitted.

20 Claims, 6 Drawing Sheets

ATM SECURITY APPARATUS AND METHOD OF USE

PRIORITY

This application is a continuation of U.S. patent application Ser. No. 17/518,008, entitled "ATM Security Apparatus and Method of Use," filed Nov. 3, 2021, the disclosure of which is incorporated by reference herein, which is a continuation of U.S. Pat. No. 11,189,138, entitled "ATM Security Apparatus and Method of Use," issued Nov. 30, 2021, the disclosure of which is incorporated by reference herein.

BACKGROUND

Automatic teller machines (ATMs) contain significant amounts of currency for dispensing to banking customers who provide certain authentication information. Because ATMs contain such significant amounts of currency, and because many ATMs are located in outdoor accessible areas, many ATMs have been vulnerable targets for vandalism and theft. In some instances where an ATM is located in an outdoor accessible area, an individual attempting to vandalize an ATM to obtain the currency it holds may use a variety of large equipment that may not otherwise be possible or practical to use on an indoor ATM. For instance, motorized vehicles have been used to vandalize parts or all of certain ATMs. In such instances, vehicles have been used to steal an entire ATM or to forcibly remove the currency dispensing box within an ATM.

While a variety of security devices have been made and used for use with banking equipment such as ATMs, it is believed that no one prior to the inventor(s) has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
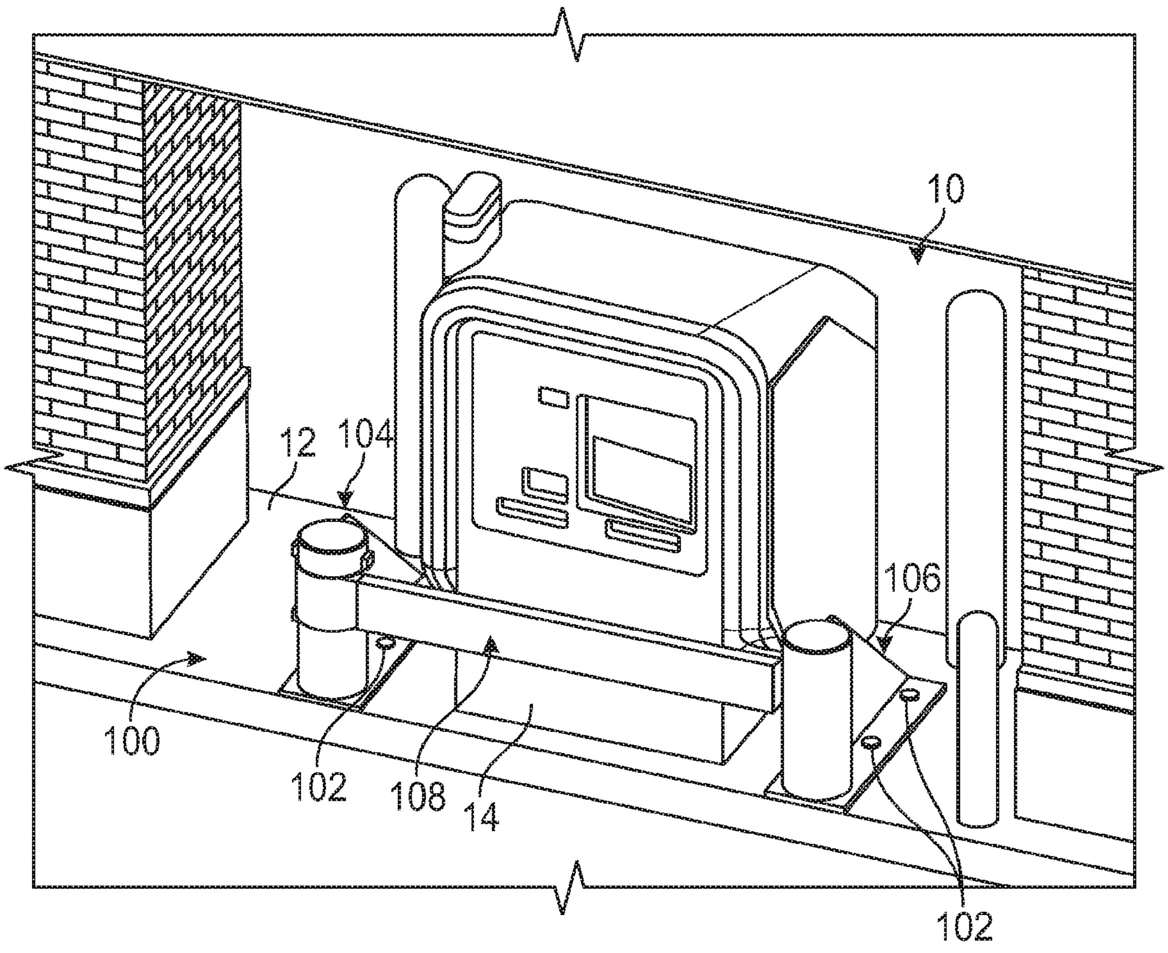
FIG. 1 depicts a perspective view of an exemplary security apparatus positioned for use with an exemplary ATM.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Exemplary Security Apparatus for Use with an ATM

FIG. 1 illustrates an exemplary security apparatus or device (100) positioned by an exemplary ATM (10). Security apparatus (100) is shown fastened to a surface (12) using one or more fasteners (102). Security apparatus (100) is positioned relative to ATM (10) such that portions of security apparatus (100) obstruct or block one or more service doors or access doors (14) of ATM (10) as will be described in further detail below. Security apparatus (100) comprises base assemblies (104, 106) and beam assembly (108), which will be described in greater detail below.

FIGS. 2A-3B illustrate another exemplary version of a security apparatus (200) for use with ATM (10) such that security apparatus (200) is usable in place of security apparatus (100). Security apparatus (200) can be fastened or secured to surface (12) using fasteners (102). In one version, fasteners (102) comprise rivets, bolts, or anchors configured to attach a structure with a masonry material such as concrete. In view of the teachings herein, other fasteners and ways to secure security apparatus (100, 200) to surface (12) or other surfaces will be apparent to those of ordinary skill in the art.

Security apparatus (200) comprises base assemblies (204, 206) and beam assembly (208). Base assemblies (204, 206) are identical to base assemblies (104, 106). Therefore, the description that follows of base assemblies (204, 206) should be understood to apply equally to base assemblies (104, 106). Also, beam assembly (208) and beam assembly (108) are the same with the exception that beam assembly (108) omits a vertical post feature that is included with beam assembly (208). Therefore, the description that follows of beam assembly (208) should be understood to apply equally to beam assembly (108) except for the omission of the vertical posts with beam assembly (108).

Base assemblies (204, 206) each include a base (210A, 210B) and a post (212A, 212B) connected with its respective base (210A, 210B). Posts (212A, 212B) extend longitudinally from bases (210A, 210B) such that posts (212A, 212B) in the present example are oriented orthogonally relative to bases (210A, 210B). Posts (212A, 212B) may be formed as part of respective bases (210A, 210B), welded to bases (210A, 210B), or otherwise fastened with bases (210A, 210B). Posts (212A, 212B) in the present example are cylindrically shaped, however, in other versions posts (212A, 212B) can have other shapes and may also be curved or oriented angularly relative to respective bases (210A, 210B). By way of example only, and not limitation, posts (212A, 212B) in another version can be rectilinear structures. Posts (212A, 212B) in some versions are solid structures that may be formed of a metal material, such as steel that can be painted or otherwise protected from corrosion. In some other versions, posts (212A, 212B) may initially be hollow structures that are fillable with another material such as concrete and then capped with a cap. In such versions, posts (212A, 212B) act as forms for holding another structure material.

Each base assembly (204, 206) also includes a gusset (214A, 214B) that connects with respective bases (210A, 210B) and posts (212A, 212B) to provide for added rigidity, strength, and/or reinforcement of base assemblies (204, 206). In the illustrated version, gussets (214A, 214B) are triangular shaped, with one side of the triangle contacting the respective post (212A, 212B) and another side of the triangle contacting the respective base (210A, 210B). In other versions, gussets (214A, 214B) can have shapes other than triangular. By way of example only, and not limitation, gussets (214A, 214B) in another version can be arcuate structures. Furthermore, in some versions, more than one gusset (214A, 214B) can be used to reinforce each respective base assembly (204, 206). And, gussets (214A, 214B) can be configured with various thicknesses to provide a desired level of reinforcement.

As shown in FIGS. 2A-3B, each base (210A, 210B) includes one or more bores (216A, 216B) that are configured to receive fasteners (102) as described above. In this manner, bases (210A, 210B) are attachable with surface (12). In some other versions, bases (210A, 210B) can be attachable with surface (12) in other ways where fasteners (102) may be omitted. By way of example only, and not limitation, in one version, a portion of base (210A, 210B) can be submerged in concrete when forming surface (12). In view of the teachings herein, other ways to secure bases (210A, 210B) to a surface surrounding or near ATM (10), or to ATM (10) itself, will be apparent to those of ordinary skill in the art.

Beam assembly (208) includes a beam (218) connected with a collar (220). Beam (218) is configured to extend horizontally between base assemblies (204, 206). In the present example, collar (220) is configured to connect with post (212B). Moreover, this connection is configured such that collar (220) is rotatable about post (212B). In this manner, rotation of collar (220) causes rotation of beam (208) since beam (208) connects with collar (208). With this configuration, beam (218) is movable between a locked state or position where beam (218) extends between posts (212A, 212B), and an unlocked state or position where beam (218) is rotated open such that beam (218) no longer extends toward and makes contact with post (212A) of base assembly (204).

Beam assembly (208) is configured such that beam (218) is located or positioned to block access to one or more service doors (14) of ATM (10) when beam (218) is in the locked state. Furthermore, access to the one or more service doors (14) may be obtained by rotating beam (218) to its unlocked state or position. With this configuration, ATM (10) is serviceable by service personnel when needed without requiring complete deinstallation of security apparatus (200).

Beam assembly (208) further includes vertically extending posts (222). Posts (222) are configured to prevent or block access to service doors (14) of ATM (10). In this manner, posts (222) may be configured to block the sole or main service door (14), or posts (222) may be configured to block secondary service doors (14) of ATM (10) while beam (218) blocks or obstructs the main service door (14). Posts (222) extend vertically from beam (218) in the present example such that posts (222) are orthogonally oriented relative to beam (218). In some other versions, posts (222) may extend from beam (218) in orientations other than orthogonal. Also, in the present example, posts (222) extend upward from beam (218), however in other versions posts (222) may extend downward from beam (218).

Figure 4:
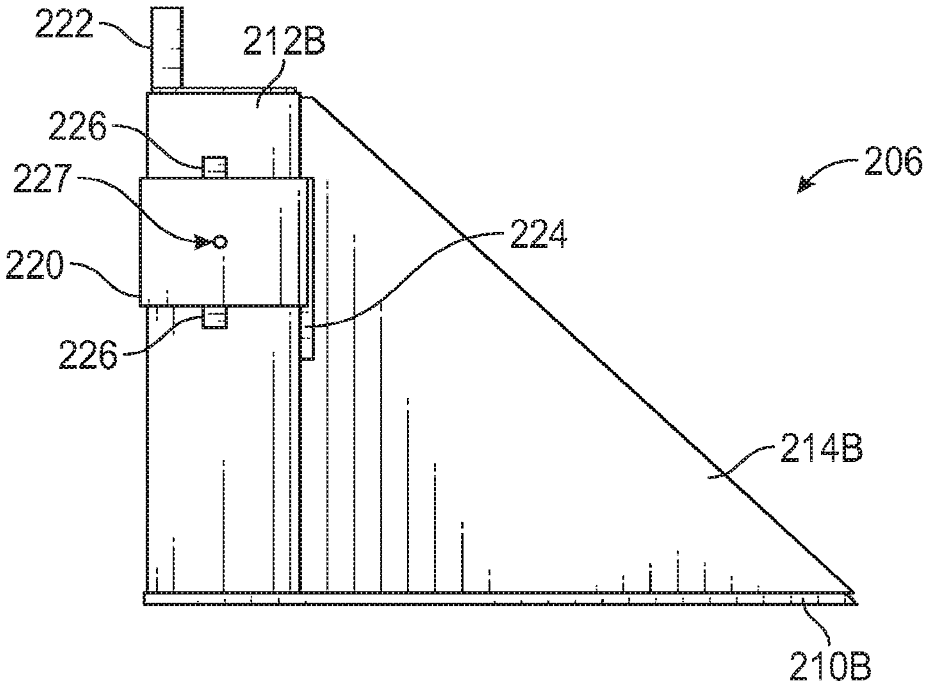
FIG. 4 depicts a side elevation view of the security apparatus of FIG. 2A.

FIG. 4 depicts a side view of security apparatus (200), showing base assembly (206). As shown, gusset (214B) of base assembly (206) includes a cut-out (224). Cut-out (224) is configured to provide a space or gap such that collar (220) extends through cut-out (224). In this manner, gusset (214B) does not impede the rotatability of collar (220) relative to post (212B).

Figure 2A:
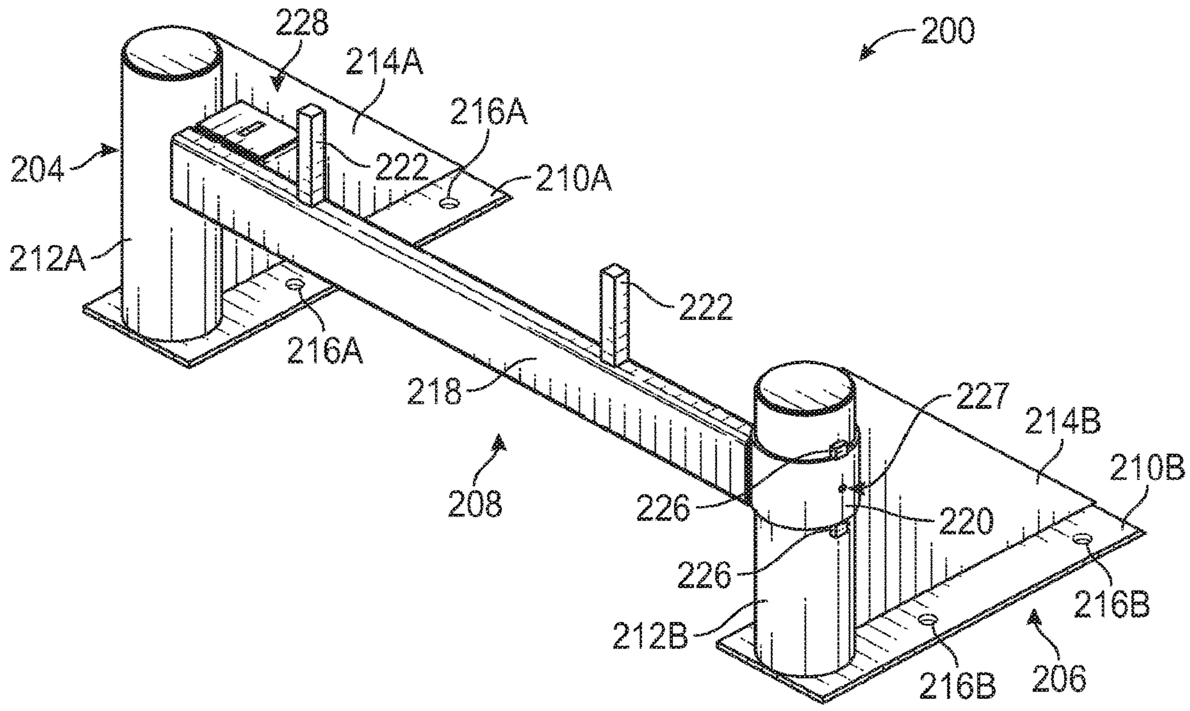
FIG. 2A depicts a front perspective view of another security apparatus similar to the security apparatus of FIG. 1, shown with the security apparatus in a closed position.
Figure 2B:
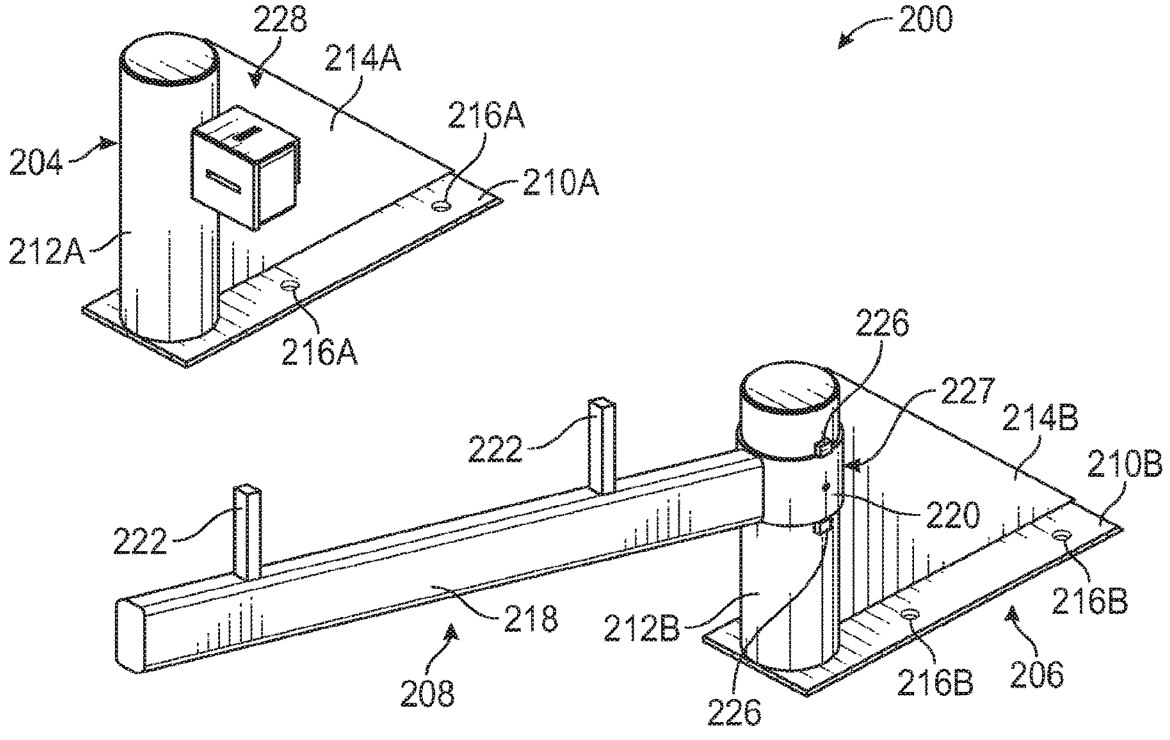
FIG. 2B depicts a front perspective view of the security apparatus of FIG. 2A, shown with the security apparatus in an open position.
Figure 3A:
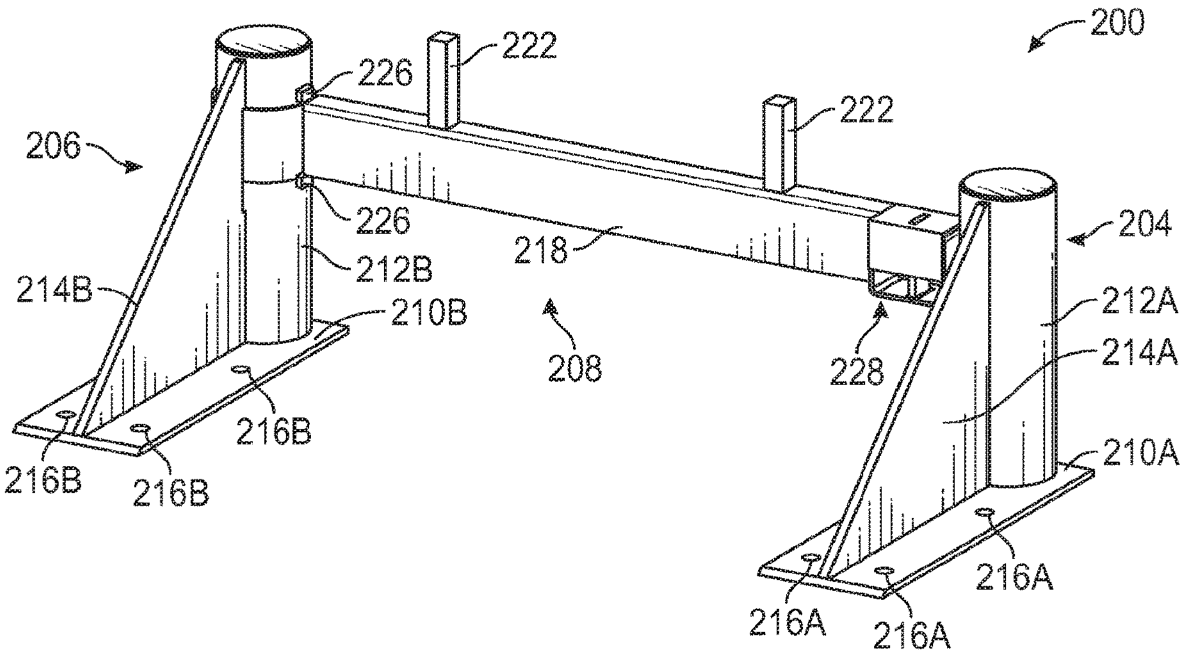
FIG. 3A depicts a rear perspective view of the security apparatus of FIG. 2A.
Figure 3B:
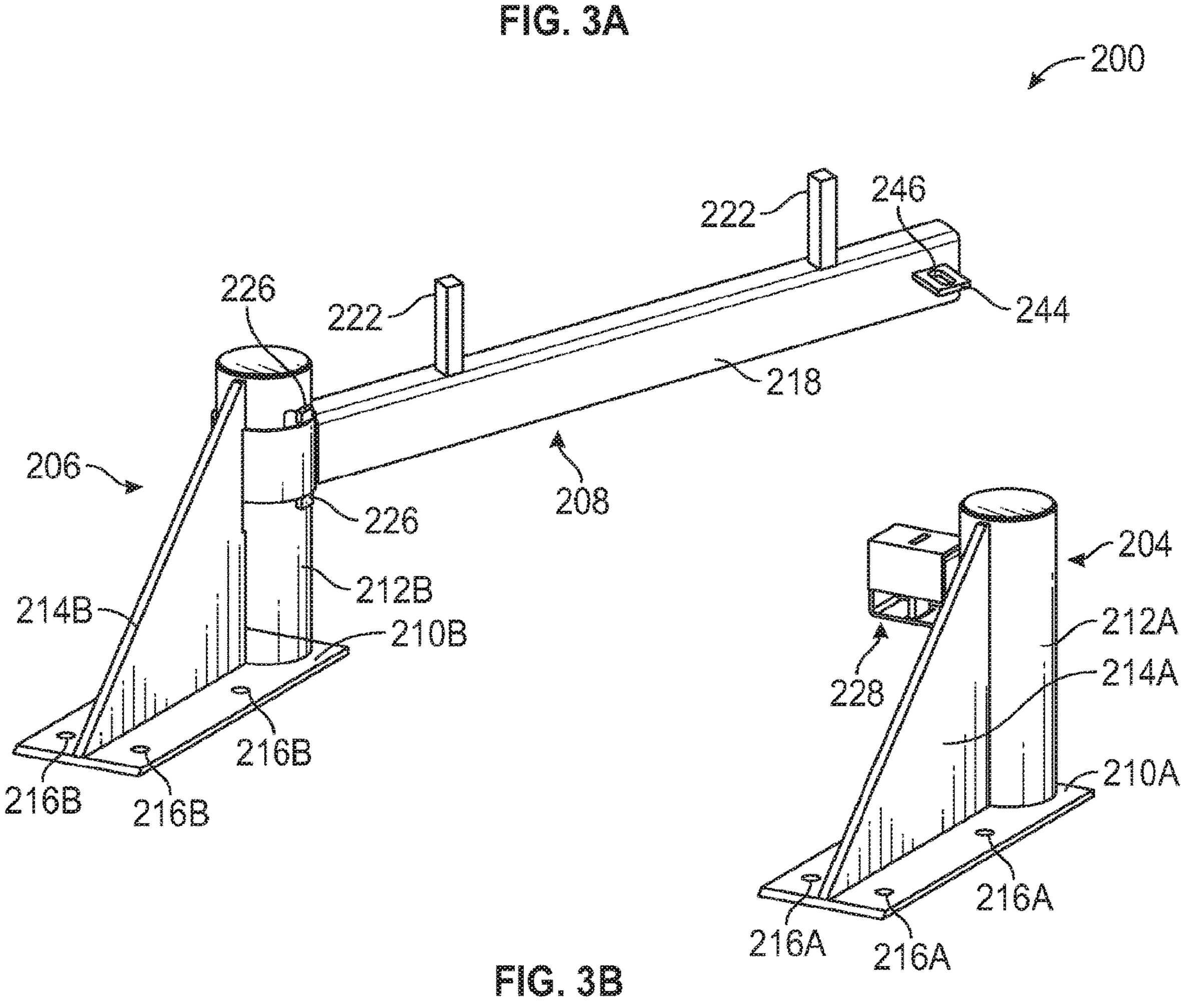
FIG. 3B depicts a rear perspective view of the security apparatus of FIG. 3A.

As shown in FIGS. 2A, 2B, and 4, post (212B) of base assembly (206) also includes guide features (226) that are configured to maintain a longitudinal position of the beam assembly (208) relative to post (214B). In the present example, guide features (226) protrude from post (212B) and act as stops against which collar (220) is positioned. In one version, guide features (222) are configured as rods that extend from one side of post (212B) through posts (212B), and out the opposite side of post (212B). In other versions, guide features (222) are connected with post (212B) but are not required to extend through post (212B). The desired position of guide features (226) along post (212B) is determined, in at least some versions, based upon locating beam (218) at a desired position relative to ATM (10) and in particular service doors (14). For instance, depending on the location of service doors (14) of an ATM (10), security apparatus (200) can be modified or configured to located guide features (226) so that beam (218) extending from collar (220) will be at a position to block access to service doors (14) when beam assembly (208) is in the locked state.

As also shown in FIGS. 2A, 2B, and 4, collar (220) includes an opening (227) in the illustrated version. Opening (227) provides for access to permit applying a lubricant between the outer surface of post (212B) and the inner surface of collar (220). Lubricant can also be applied along the top and bottom edges of collar (220) if desired. Opening (227) is positioned at or near the midpoint of the height of collar (220). With this configuration, lubricant can more easily or readily reach the surface contact area between collar (220) and post (212B) such that beam assembly (208) can swing or rotate more easily relative to post (212B) when moving beam assembly (208) between the locked and unlocked positions. In view of the teachings herein, other ways to provide lubrication or other assistance with the rotatability of beam assembly (208) relative to post (212B) will be apparent to those of ordinary skill in the art.

Figure 5:
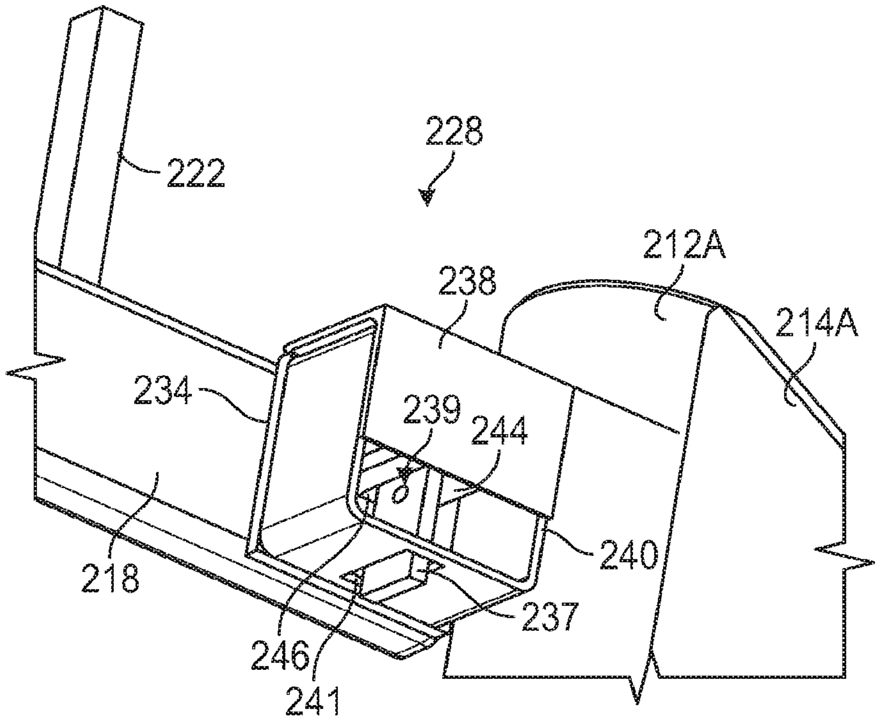
FIG. 5 depicts a partial rear perspective view of a locking assembly of the security apparatus of FIG. 2A.
Figure 6:
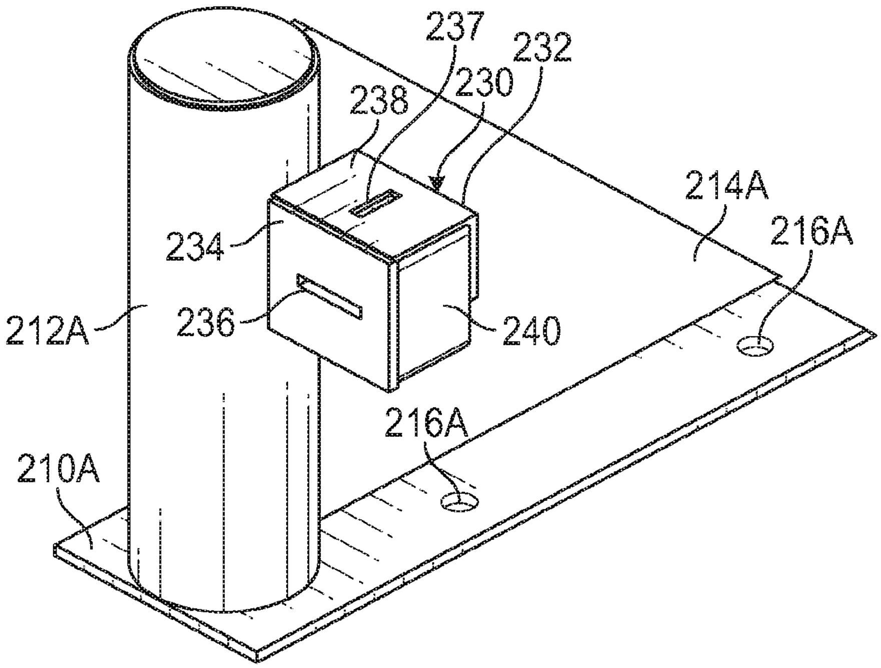
FIG. 6 depicts a partial front perspective view of the security apparatus of FIG. 2A, showing one base assembly and with a beam omitted.
Figure 7:
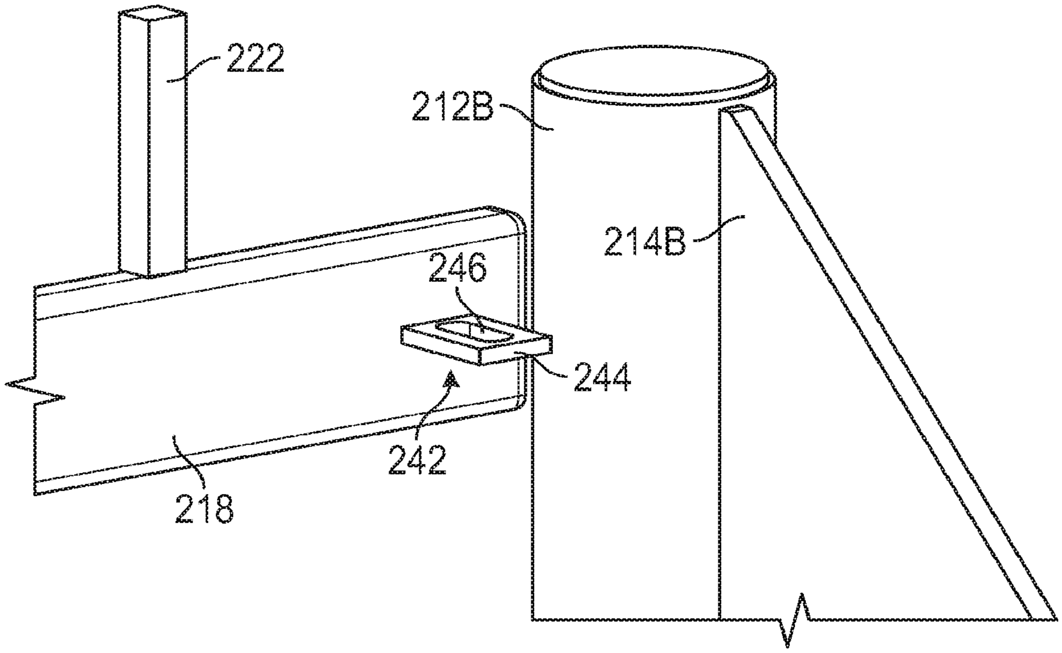
FIG. 7 depicts a partial rear perspective view of the security apparatus of FIG. 2A, shown with portions of the locking assembly omitted.

FIGS. 5-7 illustrate a locking assembly (228) of security apparatus (200). Locking assembly (228) includes a locking feature (230) connected with post (212A) of base assembly (204) as shown in FIG. 6. Locking feature (230) is welded with post (212A) in some versions, and in other versions locking feature (230) may be fastened with post (212A) in other manners as will be apparent to those of ordinary skill in the art in view of the teachings herein. In the illustrated example, locking feature (230) comprises a housing (232) configured with a front portion (234) having a slot (236). Housing (232) further has an L-shaped portion (238). As will be discussed further below, L-shaped portion (238) is removable from the remainder of housing (232). Connected with L-shaped portion (238) is a bar (237). Bar (237) extends downward orthogonally from a top surface of L-shaped portion (238). Bar (237) includes a bore (239) that is configured to receive a locking structure (not shown) such as a bolt lock, combination lock, chain, cable, etc.

Housing (232) also includes sidewall structure (240) that extends in a continuous rectangular shape have two sets of opposing sides as best seen in FIGS. 5 and 6. The bottom portion of sidewall structure (240) includes an opening (241) that is configured such that a lower portion of bar (237) can fit with opening (241) when L-shaped portion (238) is selectively connected with housing (232). Similarly, the top portion of sidewall structure (240) includes an opening (not shown) similar to opening (241) that is configured such that bar (237) fits through the opening (not shown) in the top portion of sidewall structure (240) when L-shaped portion (238) is selectively connected with housing (232). In some other versions, sidewall structure (240) is a three-sided structure such that the top portion is omitted such that L-shaped portion (238) acts as the top portion for housing (232) when L-shaped portion (238) is selectively connected with housing (232).

Locking assembly (228) further includes a locking feature (242) connected with beam (218) of beam assembly (208) as shown in FIG. 7. In the illustrated example, locking feature (242) comprises a tongue (244) having a slot (246) extending therethrough. With this configuration, locking feature (230) works with or complements locking feature (242) to selectively secure beam (218) relative to posts (212A, 212B) and base assemblies (204, 206). More specifically, when beam assembly (208) is rotated to the closed or locked position, tongue (244) fits within slot (236) of housing (232). Thereafter L-shaped portion (238) with connected bar (237) is connected with housing (232) such that bar (237) extends through the opening (not shown) in the top portion of sidewall structure (240). Bar (237) further extends through slot (246) of tongue (244), and thereafter the end portion of bar (237) fits within opening (241) of the bottom portion of sidewall structure (240). At this point a locking structure as mentioned above is connectable through bore (239), and this prevents removal of L-shaped portion (238) with connected bar (237) from housing (232). And with bar (237) through slot (246) of tongue (244), beam assembly (208) is selectively secured in place relative to base assemblies (204, 206) with beam (218) positioned adjacent posts (212A, 212B).

In view of the teaching herein, other ways to configure locking assembly (228) to selectively lock or secure the relative position of beam assembly (208) with respect to base assemblies (204, 206) will be apparent to those of ordinary skill in the art. By way of example only, and not limitation, in some versions housing (232) and or tongue (244) may be modified to have other shapes or features that completement each other to provide the ability to selectively lock or secure beam (218) with post (212A). Additionally, while the illustrated example shows locking assembly (228) associated with post (212A) and base assembly (204), in other versions all or portions of locking assembly (228) could be configured to instead be connected with base assembly (208) and post (212B). These modifications are merely exemplary and other such modifications will be apparent to those of ordinary skill in the art in view of the teachings herein.

II. Exemplary Security Apparatus Method of Use

Figure 8:
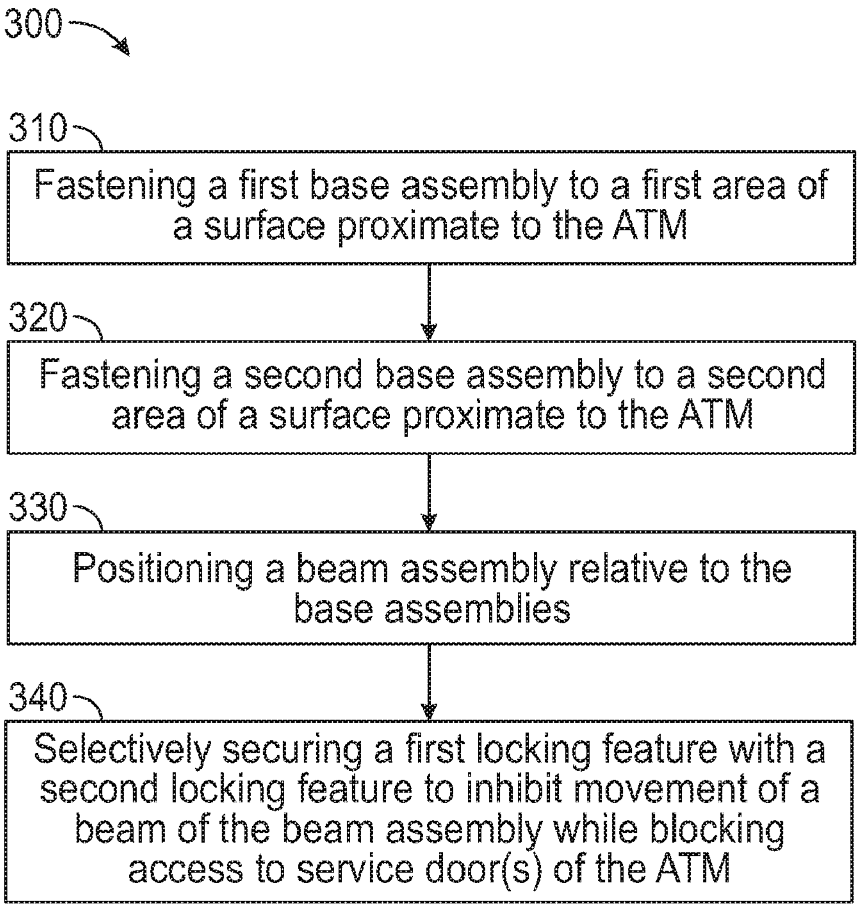
FIG. 8 depicts a flowchart of an exemplary method for using an exemplary security apparatus with an ATM.

FIG. 8 illustrates an exemplary method (300) of using security apparatus (100, 200) to provide enhanced security to ATM (10). As shown, one step (310) is fastening base assembly (204) to a first area of surface (12) proximate to ATM (10). As mentioned above, base assembly (204) comprises base (210A) and post (212A) extending orthogonally from base (210A). Another step (320) is fastening base assembly (206) to a second area of surface (12) proximate to ATM (10). Base assembly (206) comprises base (210B) and post (212B) extending orthogonally from base (210B). At step (330), beam assembly (208) is positioned. As mentioned above, beam assembly (208) includes beam (218) that extends substantially horizontally, vertically extending posts (222) that extend from beam (218), and locking feature (230) configured to selectively connect with locking feature (242) to selectively connect beam assembly (208) with a select one of base assemblies (204, 206). In one example, beam assembly (208) is connectable with and configured to extend from base assembly (206) to base assembly (204), and positing beam assembly (208) includes blocking access to one or more service doors (14) of ATM (10). Another step (340) selectively secures locking feature (230) with locking feature (242) to inhibit movement of beam (218) of beam assembly (208) relative to base assemblies (204, 206).

In other aspects of method (300), fastening base assemblies (204, 206) to surface (12) proximate to ATM (10) includes driving a plurality of fasteners (102) through a plurality of bores (216A, 216B) in base assemblies (204, 206). In other versions of method (300), one or more of base assemblies (204, 206) comprise gussets (214A, 214B) configured to connect respective posts (212A, 212B) and bases (210A, 210B). Still yet, other versions of method (300) include moving beam assembly (208) from a locked position to an unlocked position, wherein in the unlocked position one or more service doors (14) of ATM (10) are accessible. As mentioned above, beam assembly (208) comprises collar (220), wherein collar (220) is configured to connect with post (212B) of base assembly (206). Further, collar (220) is configured to rotate about post (212B), wherein moving beam assembly (208) from the locked position to the unlocked position. In view of the teachings herein, other steps or modification to the steps described herein will be apparent to those of ordinary skill in the art.

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus for enhancing security of an ATM comprises (a) a first base assembly, (b) a second base assembly, and (c) a beam assembly connectable with and configured to extend from the first base assembly to the second base assembly, wherein the beam assembly is further configured to selectively connect with the second base assembly, and wherein the beam assembly is further configured to selectively block access to one or more service doors of the ATM.

Example 2

The apparatus of Example 1, wherein the beam assembly comprises a beam that extends substantially horizontally, and wherein the beam assembly further comprises one or more vertically extending posts that extend from the beam.

Example 3

The apparatus of any one or more of Example 1 through Example 2, wherein one or more vertically extending posts are configured to block access to the one or more service doors of the ATM.

Example 4

The apparatus of any one or more of Example 1 through Example 3, wherein the beam assembly comprises a first locking feature configured to selectively connect with a second locking feature of a select one of the first and the second base assemblies to selectively connect the beam assembly with the select one of the first and the second base assemblies.

Example 5

The apparatus of any one or more of Example 1 through Example 4, wherein the beam assembly comprises a collar, wherein the collar is configured to connect with the first base assembly, and further where the collar is configured to permit rotation about the first base assembly to selectively move the beam assembly from a locked position to an unlocked position.

Example 6

The apparatus of any one or more of Example 1 through Example 5, wherein the first base assembly comprises a post extending longitudinally, wherein the post is configured to receive a collar of the beam assembly.

Example 7

The apparatus of Example 6, wherein the first base assembly comprises a base and a gusset configured to connect the post and the base to strengthen the base assembly, wherein the gusset comprises a cut-out configured to provide space for the collar.

Example 8

The apparatus of Example 6, wherein the post of the first base assembly comprises one or more guide features configured to maintain a longitudinal position of the beam assembly relative to the post.

Example 9

The apparatus of any one or more of Example 1 through Example 8, wherein the first and second base assemblies each comprises a base, a post extending orthogonally from the base, and a gusset configured to connect the post and the base.

Example 10

The apparatus of Example 9, wherein the gusset is further configured as a triangular support with a first side of the triangular support connecting with the post and with a second side of the triangular support connecting with the base.

Example 11

The apparatus of Example 9, wherein the base comprises one or more bores configured to receive fasteners for attaching the base to a surface.

Example 12

The apparatus of any one or more of Example 1 through Example 11, further comprising a locking assembly with a first portion attachable with the beam assembly, wherein the locking assembly is configured to selectively secure the beam assembly to restrict movement of the beam assembly relative to the first and the second base assemblies.

Example 13

The apparatus of Example 12, wherein the locking assembly comprises a second portion attachable with a select one of the first and the second base assemblies.

Example 14

The apparatus of Example 13, wherein the first portion of the locking assembly comprises a first locking feature, wherein the second portion of the locking assembly comprises a second locking feature, wherein the first locking feature is configured to selectively connect with the second locking feature.

Example 15

A method for providing added security to an ATM includes: (a) fastening a first base assembly to a first area of a surface proximate to the ATM, wherein the first base assembly comprises a first base and a first post extending orthogonally from the first base, (b) fastening a second base assembly to a second area of the surface proximate to the ATM, wherein the second base assembly comprises a second base, and a second post extending orthogonally from the second base, (c) positioning a beam assembly comprising (i) a beam that extends substantially horizontally, (ii) one or more vertically extending posts that extend from the beam, and (iii) a first locking feature configured to selectively connect with a second locking feature of a the second base assembly to selectively connect the beam assembly with the second base assembly, wherein the beam assembly is connectable with and configured to extend from the first base assembly to the second base assembly, and wherein positing the beam assembly includes blocking access to one or more service doors of the ATM, and (d) selectively securing the first locking feature with the second locking feature to inhibit movement of the beam of the beam assembly relative to the first and the second base assemblies.

Example 16

The method of Example 15, wherein fastening the first and the second base assemblies to the surface proximate to the ATM includes driving a plurality of fasteners through a plurality of bores in the first and the second base assemblies.

Example 17

The method of any one or more of Example 15 through Example 16, wherein the first base further comprise a first gusset configured to connect the first post and the first base.

Example 18

The method of any one or more of Example 15 through Example 17, wherein the second base further comprises a second gusset configured to connect the second post and the second base.

Example 19

The method of any one or more of Example 15 through Example 18, further comprising moving the beam assembly from a locked position to an unlocked position, wherein in the unlocked position the one or more service doors of the ATM are accessible.

Example 20

The method of any one or more of Example 15 through Example 19, wherein the beam assembly comprises a collar, wherein the collar is configured to connect with the first post of the first base assembly, and further where the collar is configured to rotate about the first post, wherein moving the beam assembly from the locked position to the unlocked position includes rotating the collar about the first post.

IV. Miscellaneous

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. An apparatus for enhancing security of an ATM, wherein the apparatus comprises:

(a) two or more base assemblies mountable external to the ATM;

(b) a selectively movable beam assembly extending between the base assemblies, wherein the beam assembly includes an open state and a closed state, wherein in the open state the beam assembly permits access to one or more exterior service doors of the ATM and in the closed state the beam assembly blocks access to the one or more exterior service doors of the ATM; and (c) a locking assembly having a housing, a first locking feature, and a second locking feature, wherein the first locking feature selectively engages with the second locking feature at an engagement between the first and second locking features and when engaged the locking assembly retains the beam assembly in the closed state, wherein the second locking feature includes a shield that blocks access to the engagement between the first and second locking features, and wherein the housing and a surface of the beam assembly cooperate with the shield to further block access to the engagement between the first and second locking features.

2. The apparatus of claim 1, wherein the shield of the second locking feature includes a first planar body and a second planar body connected together in an L shape.

3. The apparatus of claim 2, wherein the second locking feature includes a bar configured to selectively engage the first locking feature.

4. The apparatus of claim 3, wherein the bar includes an aperture configured to accept a locking structure.

5. The apparatus of claim 4, wherein the shield is configured to simultaneously block access to the locking structure while the bar prevents the beam assembly from being transitioned from the closed state to the open state.

6. The apparatus of claim 1, wherein the housing includes a first planar wall, a second planar wall, a third planar wall, and fourth planar wall, wherein each of the first, second, third, and fourth planar walls are configured to inhibit access to the first and second locking features when the first and second locking features are engaging one another.

7. The apparatus of claim 6, wherein the first planar wall is configured to engage the beam assembly in the closed position and defines a first aperture configured to accept the first locking feature.

8. The apparatus of claim 7, wherein the second planar wall defines a second aperture configured to accept the separate insertable member when the separate insertable member is installed within the first locking feature and prevent the beam assembly from being transitioned from the closed position to the open position.

9. The apparatus of claim 8, wherein the separate insertable member includes a fifth planar wall and a sixth planar wall, wherein the fifth and sixth planar walls are configured to further inhibit access to the first and second locking feature when the first and second locking features engage one another.

10. The apparatus of claim 9, wherein the separate insertable member includes a bar configured to be inserted within the first locking feature to prevent the beam assembly from being transitioned from the closed position to the open position.

11. The apparatus of claim 10, wherein the bar includes a bore configured to accept a locking structure, wherein the locking structure is configured to prevent removal of the separate insertable member.

12. An apparatus for enhancing security of an ATM, wherein the apparatus comprises:

(a) a first support assembly;

(b) a second support assembly;

(c) a beam assembly extendable from the first support assembly to the second support assembly, wherein the beam assembly permits access to one or more service doors of the ATM when in an open position and blocks access to one or more service doors of the ATM when in a closed position;

(d) a first locking feature affixed to the beam assembly;

(e) a separate insertable member including a second locking feature, wherein the second locking feature is configured to selectively engage the first locking feature to selectively connect the beam assembly with the second support assembly; and (f) a housing affixed to the second support assembly, wherein the housing is configured to shield all or a portion of either or both of the first locking feature and the second locking feature when engaged.

13. The apparatus of claim 12, wherein the beam assembly is rotatable relative to the first support assembly.

14. The apparatus of claim 13, wherein the first support assembly includes a post, a base, and a gusset having a cutout configured to allow the beam assembly to rotate relative to the first support assembly.

15. The apparatus of claim 14, wherein the gusset includes a triangular support interconnecting the post and the base.

16. The apparatus of claim 15, wherein the gusset extends along sides of the ATM.

17. A method of using an apparatus to provide additional security to an ATM, wherein the apparatus includes (a) two or more base assemblies; (b) a selectively movable beam assembly extending between the base assemblies, wherein the beam assembly includes an open state and a closed state, wherein the beam assembly in the open state allows access to one or more service doors of the ATM and in the closed state blocks access to the one or more service doors of the ATM; (c) a housing; (d) a first locking feature positioned on the beam assembly and (e) a second locking feature, the method comprising:

(a) transitioning the beam assembly from the open state to the closed state;

(b) inserting the second locking feature within the first locking feature preventing transitioning of the beam assembly from the closed state to the open state; and (c) installing a locking structure in the second locking feature to prevent removal of the second locking feature from the first locking feature.

18. The method of claim 17, wherein the first locking feature is inserted within the housing during the step of transitioning the beam assembly from the open state to the closed state.

19. The method of claim 18, wherein the second locking feature inhibits access to the housing during the step of inserting the second locking feature within the first locking feature.

20. The method of claim 19, further comprising inserting the second locking feature within a bore defined by the housing to further prevent transitioning the beam assembly from the closed state to the open state.

* * * * *